United States Patent [19]
Miller

[11] 3,873,028
[45] Mar. 25, 1975

[54] PRECISION TORCH ASSEMBLY
[75] Inventor: Richard W. Miller, Denton, Tex.
[73] Assignee: Victor Equipment Company, Denton, Tex.
[22] Filed: Dec. 3, 1973
[21] Appl. No.: 421,062

[52] U.S. Cl. ............................................. 239/413
[51] Int. Cl. ............................................. B05b 7/12
[58] Field of Search ..................... 239/413, 433, 600

[56] References Cited
UNITED STATES PATENTS
| | | | |
|---|---|---|---|
| 1,116,204 | 11/1914 | Baird | 239/413 |
| 1,793,052 | 2/1931 | Buttner | 239/413 |
| 1,940,111 | 12/1933 | Austin | 239/413 |
| 3,508,567 | 4/1970 | Kirk et al. | 239/413 |

Primary Examiner—Lloyd L. King
Attorney, Agent, or Firm—Wofford, Felsman, Fails & Zobal

[57] ABSTRACT

A precision torch assembly characterized by a small torch tip; an elbow assembly carrying the torch tip and including a bent tubular elbow; an elbow nut retaining the elbow in engagement with a resilient gasket in a head; the head also including a first main passageway and communicating respective fuel and oxygen passageways with respective poppet valves and seats; a barrel connected with the head for serving as a handle; and respective fuel and oxygen passageways extending longitudinally within the barrel and adapted at their hose end for connecting with respective fuel and oxygen hoses. In preferred embodiments, the respective hoses, valves and fittings are color coded; and hand tightenable fittings are employed. Also disclosed are respective embodiments and structures, such as the improved poppet valves that cannot be completely unscrewed, and the filter for preventing plugging of the small tip.

10 Claims, 13 Drawing Figures

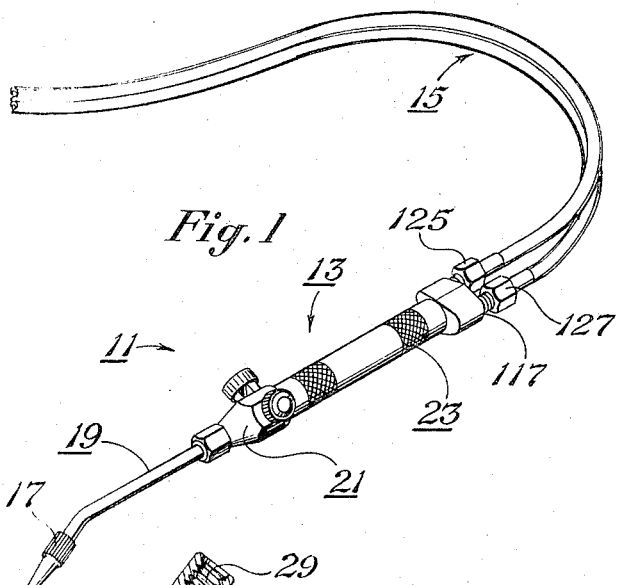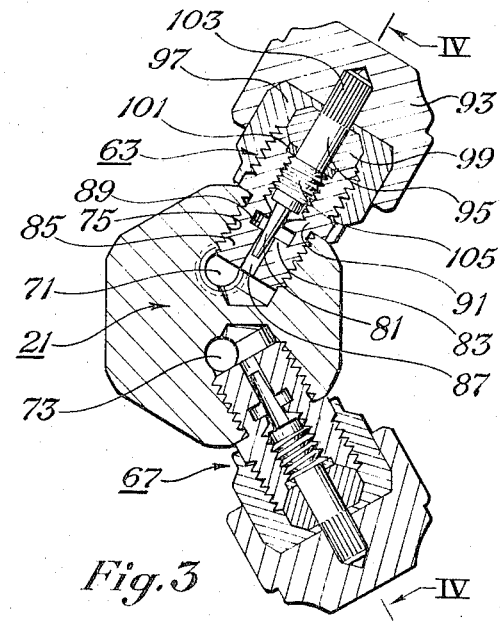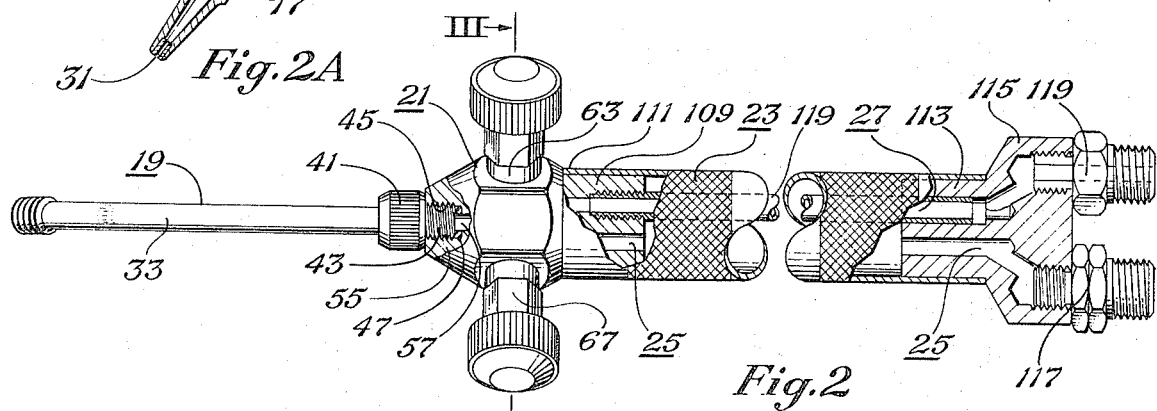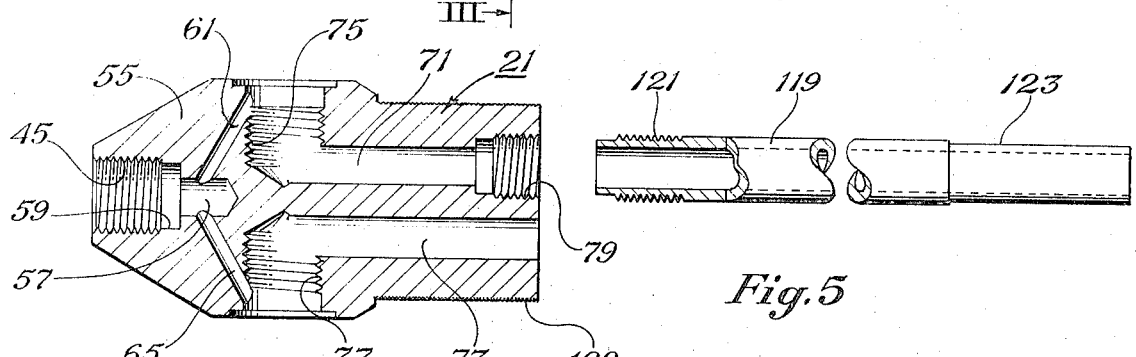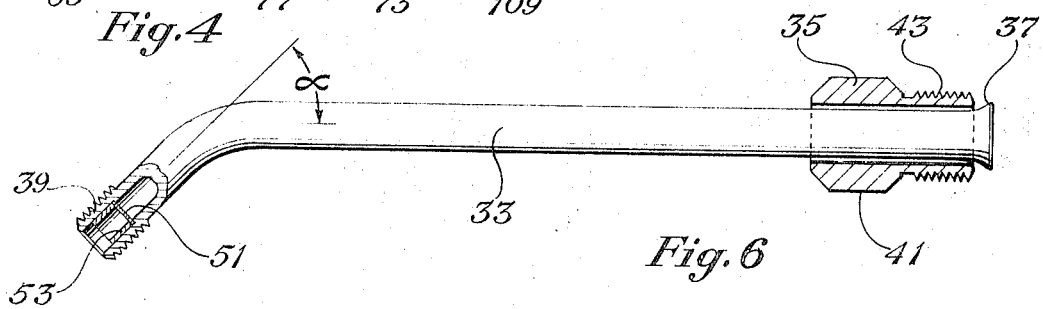

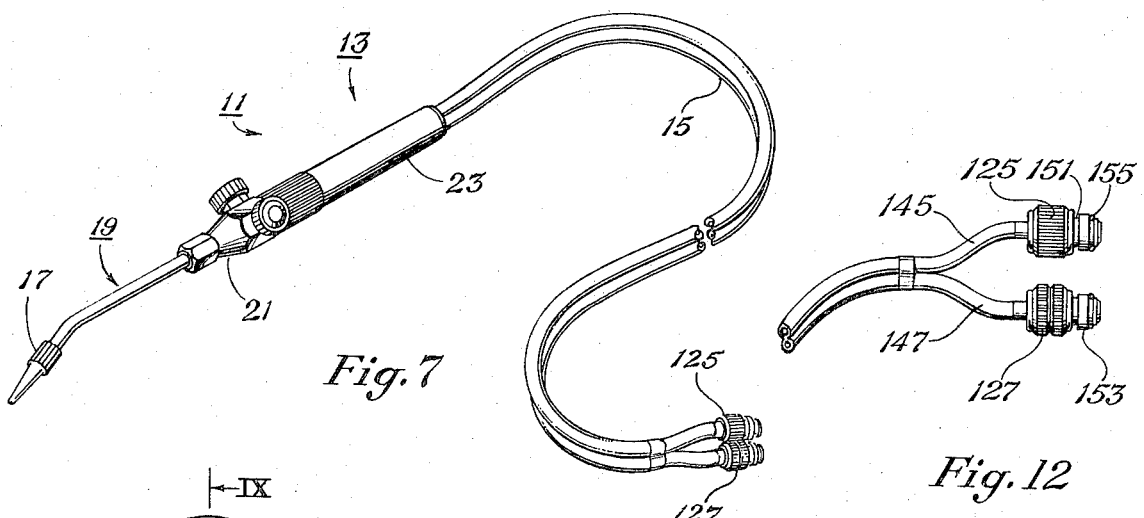
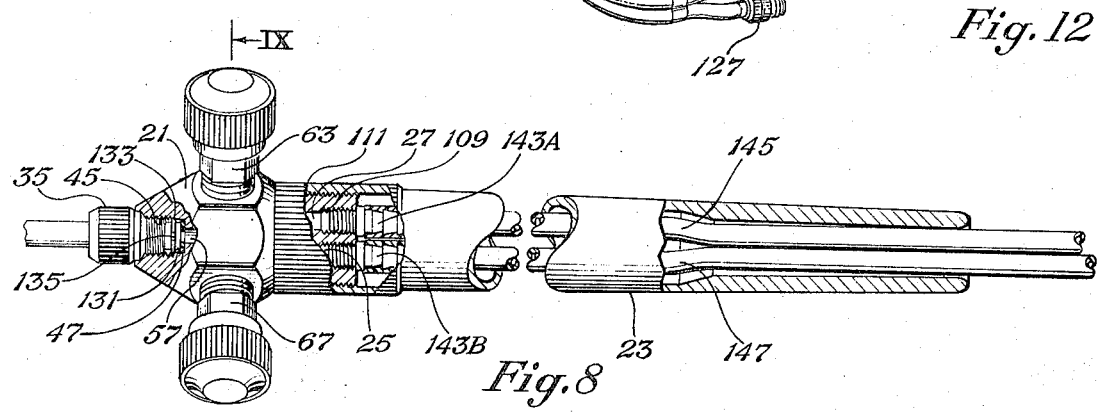
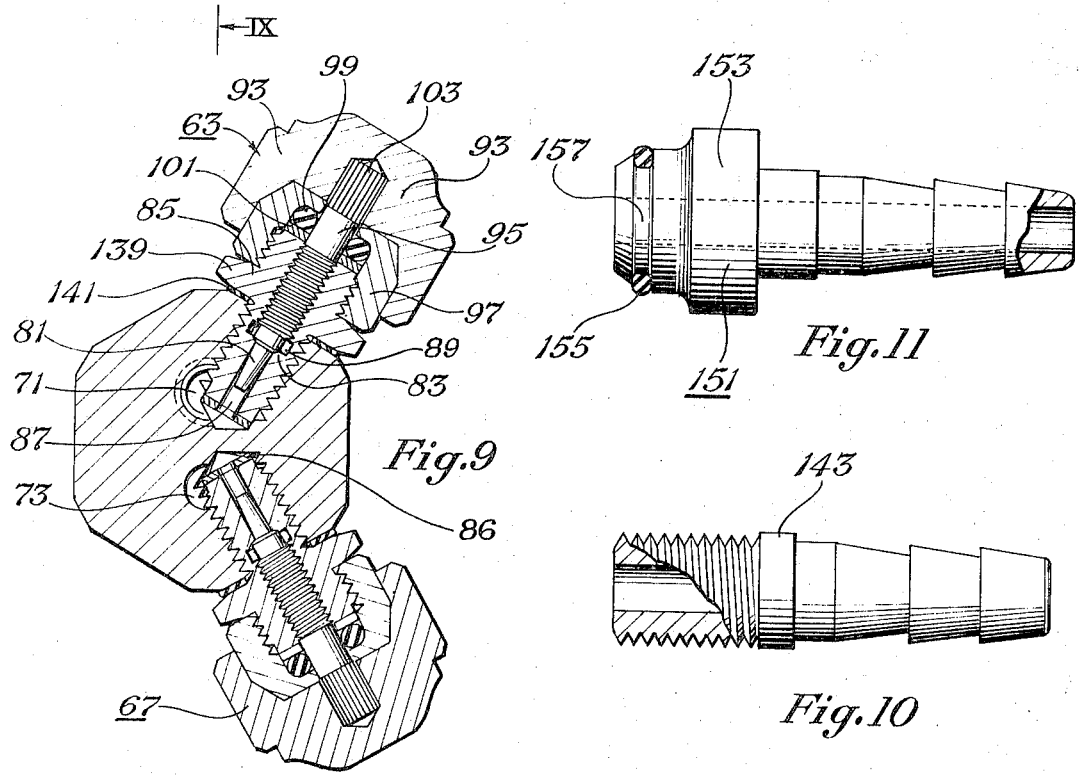

PRECISION TORCH ASSEMBLY

BACKGROUND OF THE INVENTION

1. Field of the Invention

This invention relates to torches. More particularly, it relates to precision torch assemblies that can be employed for fine work, such as done by jewelers, dentists, electronic technicians and hobbyists.

2. Description of the Prior Art

The advent of welding solved many problems that had plagued manufacturers earlier. The use of welding torches, heating torches and the like also helped the repairman to perform repairs on the site instead of having to send the article back to the factory to be repaired. A wide variety of different types of torches have been known in the prior art. Heretofore, however, the torches were assembled by highly skilled technicians who could discern through their experience, the correct color of the silver soldering of the joints and the like that were employed in assembling the torch components. Thus, insofar as I am aware, the prior art has not provided an economical precision torch assembly that has the following desirable features.

1. In the overall assembly, it is not necessary that wrenches and fittings requiring wrench level torque be employed. On the contrary, it is desirable that a precision torch assembly have hose connections, at both the torch and the regulator for the fuel and oxygen, that can be installed with the hands alone.

2. Although two hoses are employed, it is desirable, in most installations in which precision torch assembly is required, that the dual hoses be Siamese-type hoses for unitary traversal intermediate the torch and the source of fuel and oxygen, such as the bottles. This prevents tangling and is less unsightly.

3. It is desirable that both the hoses and the respective fittings allowing the hand assembly be color coded red and green for the fuel and oxygen gases. This adds a positive safety factor. Further, it is desirable that the torch, per se, have the following general features not heretofore provided.

4. In some of the prior art torches, when the control knobs on the poppet valves were loosened to allow flow, it was possible to back them completely out so that the control knob was in the hand. This has been hazardous from the standpoint of fires, loose oxygen and the like. It is desirable that the control knobs on the respective poppet valves have stops that prevent their being backed completely out of their threaded aperture.

5. It is desirable that the elbow supporting the torch tip be rotatable to allow positioning the torch tip at any desired angle for working on particular items. The rotational positioning of the torch tip at a desired angle should not require the use of wrenches but should be able to be done with only hand-tight connections.

6. It is desirable that the elbow supporting the torch tip be seated on a resilient seat to facilitate sealing, rather than requiring a metal-to-metal seat and seal, with its expensive exact finishing.

7. It is necessary that the elastomer that is employed in any valve assemblies have special hardness and be compatible with all common fuel gases; such as acetylene, propane, mapp and natural gas, as well as oxygen; in order that the torch be widely useful in all environments and applications requiring precision torches.

8. It is desirable that inserts be employed in the valves to afford an automatic sealing and seating with a heat treated hardened stem without galling in order to correct for variation in wear.

9. It is desirable that torch components be made such that they can be assembled without requiring highly skilled technicians or technicians with great strength.

10. It is desirable that a filter be provided upstream of the torch tip to prevent contamination or blockage of the unusually small orifice in the torch tip, as well as serve as a gas mixer and flashback arrester.

11. It is desirable that the handle on the torch be maintained cool so as to prevent discomfort to the user.

Accordingly, it is an object of this invention to provide a precision torch assembly that has one or more of the features delineated hereinbefore and not heretofore provided by the prior art.

It is also an object of this invention to provide a precision torch assembly that has most or all of the features delineated hereinbefore.

These and other objects, particularly with respect to specific embodiments, will become apparent from the following descriptive matter, particularly when taken in conjunction with the drawings.

BRIEF DESCRIPTION OF THE DRAWINGS

FIG. 1 is a partial isometric view in accordance with one embodiment of this invention.

FIG. 2 is a partial top plan view, partly in section, of the torch of FIG. 1.

FIG. 2A is a cross sectional view of the torch tip of FIG. 1.

FIG. 3 is a partial cross sectional view taken along the lines III—III of FIG. 2.

FIG. 4 is a partial cross sectional view of the head taken along the lines IV—IV of FIG. 3.

FIG. 5 is an elevational view, partly in section, of the oxygen tube within the barrel of FIG. 2.

FIG. 6 is an elevational view, partly in section, of the elbow assembly of FIG. 2.

FIG. 7 is a partial isometric view of another embodiment of this invention.

FIG. 8 is a top plan view of the torch of FIG. 7.

FIG. 9 is a partial cross sectional view taken along the lines IX—IX of FIG. 8.

FIG. 10 is an elevational view, partly in section, of the tail piece, or hose barb, of FIG. 7 for attaching a hose to the torch.

FIG. 11 is an elevational view, partly in section, of a hose barb of FIG. 7 for attaching a hose to a regulator.

FIG. 12 is a partial elevational view of the connections for connecting the hoses with the regulator in FIG. 7.

DESCRIPTION OF PREFERRED EMBODIMENTS

Referring to FIG. 1, there is illustrated the torch assembly 11 comprising the torch 13 and the hose assembly 15.

The torch 13 includes the major elements or subassemblies of a torch tip 17, an elbow assembly 19, a head 21, a barrel 23 serving as a handle; and respective fuel and oxygen passageways 25 and 27, FIG. 2, extending longitudinally within the barrel and adapted at their hose end for sealing connection with the respective fuel and oxygen hoses.

The torch tip 17 is illustrated in FIG. 2A. The torch tip 17 has internal thread 29 for being screwed onto the elbow assembly 19. At the tip end, a precision orifice 31 is formed. Initially, I have provided only a few orifices with a few different diameters, although it is envisioned that any diameter could be employed. For example, I have provided orifices of 0.011 inch, 0.020 inch and 0.029 inch. If desired, precision jeweled bushings, such as precision sapphire bearings having exceptionally small orifices of about 0.003–0.006 inch, could be employed. This allows the exceptionally fine flame that is needed in fine working, as in jewelry, in dental work or in the precise welding necessary for electronics or sculpting. Ordinarily, the torch tip 17 will be formed of metal; such as, copper or a copper-based alloy like brass; with or without a chromium finish; stainless steel; aluminum; or the like. On the other hand, it may be formed of ceramics or other materials having high melting temperature, since the fine work does not ordinarily subject the torch tip to the mechanical beating that larger torch tips are subjected to.

The elbow assembly 19, FIGS. 2 and 6, is connected at its exterior, or tip, end with the torch tip 17 and at its other, or head, end with head 21. The elbow assembly 19 includes a tubular elbow 33 and an elbow nut 35.

The tubular elbow 33 is straight adjacent its head end and is bent at a predetermined angle near its tip end for viewing the work piece and using the torch 13. As illustrated, its head end 37 is a smooth, flared end that is adapted to sealingly seat against a resilient gasket and seal, even if the elbow 33 is rotated about its longitudinal axis to another angular position. Its tip end 39 has an external thread that mates with the thread 29 in the torch tip 17. The elbow 33 may be formed of any suitable material that is able to withstand the heat and have adequate strutural strength. Ordinarily, it is formed of a metal such as the copperbased alloys, stainless steel or aluminum.

The elbow nut 35 is disposed peripherally about the smooth flared head end 37 so as to retain the flared end in engagement with a gasket in the head 21. The elbow nut has a knurled finish 41 for being hand tightened into position. The elbow nut 35 has a threaded portion 43 for threadedly engaging a tapped aperture 45 in the head 21 and retaining the sealing engagement between the smooth flared head end 37 and a gasket 47 in the tapped aperture 45. The term "tapped aperture" is used herein in its broad sense to mean any threaded bore regardless of how it is formed. The resilient gasket 47 may be formed of any suitable sealing material. As illustrated, it comprises a Teflon washer having only about one tenth of an inch or less thickness. When the elbow nut 35 is screwed inwardly by hand, it forces the flared end 37 to seat against the resilient gasket 47 and seal, regardless of the angle at which the tip end is held. The resilient gasket 47 seals against both its seat in the head 21 and the smooth flared end 37. Consequently, the gases are forced to flow out the tubular elbow 33 and do not leak around the head end 37.

The elbow 33 is bent at an angle $\alpha$ near its tip end 39. As illustrated, the angle $\alpha$ is 45 degrees (°). The angle $\alpha$ may be any angle between about 30° and about 60° and still effect satisfactory results. The bend must not be so sharp as to induce too much stress into the elbow. For example, the bend may be that formed by bending about an internal radius of about 0.37 inch. As illustrated, the elbow 33 is formed of brass tubing with a half hard temper and having a 180 grit satin finish of chrome.

As illustrated, also, the elbow 33 includes a built-in filter 51 immediately upstream of the torch tip 17. The filter 51 is held in place by a filter retainer ring 53. Preferably, the filter 51 not only filters the gas passing through the torch tip 17 to prevent clogging of the fine orifice in the tip, but is heat conductive so as to act as a flashback arrester. The filter also serves as a mixing device to effect mixing of the fuel and oxygen immediately upstream of the torch tip 17. As illustrated, the filter comprises a 200 mesh screen. The screen may be of any metallic constituent, such as copper, nickleplated copper, stainless steel, aluminum, or the like. The retainer ring 53 comprises a quasi-cylindrically shaped tube having a cross sectional shape in the form of a C. In this way, the ends may be compressed toward each other for insertion, yet spring out to retain the filter 51 in place. As illustrated, the retainer ring 53 comprises a phosphor bronze, spring-tempered ring. Other materials having the desired strength and heat resistance may be employed if desired. Any other satisfactory filter and method of retention may be employed if they will effect the described end results.

Thus, it can be seen that the elbow assembly 19 holds the filter, flashback arrester, and mixer 51 and sealingly holds the torch tip 17 cantilevered from the head 21.

The head 21 includes an elbow end 55, or end adjoining the elbow 33, and a first main passageway 57 for conducting a mixture of fuel and gas to the elbow assembly 19. As illustrated more clearly in FIG. 4, the tapped aperture 45 is disposed in the elbow end 55 and about the first main passageway 57. A first annular recess 59 is disposed peripherally about the first main passageway for containing the resilient gasket 47 and the elbow's flared end 37 retained sealingly thereagainst. An oxygen passageway 61 extends from the first main passageway 57 into fluid communication with the oxygen valve 63, FIGS. 2 and 3. Similarly, the fuel passageway 65 extends from the first main passageway 57 into fluid communication with the fuel valve 67. The head 21 contains an oxygen passageway 71 upstream of the oxygen valve 63 for conducting oxygen thereto. The head 21 also has a fuel passageway 73 upstream of the fuel valve 67 for conducting fuel thereto. Intermediate the oxygen passageway 61 and the oxygen passageway 71 there is a tapped aperture 75 for receiving the oxygen valve 63. Similarly, intermediate the fuel passageway 65 and the fuel passageway 73, there is a second tapped aperture 77 for receiving the fuel valve 67. A tapped aperture 79 is provided at the upstream end of the oxygen passageway 71 for receiving an oxygen tube that is threadedly inserted therewithin. As illustrated, the head 21 has a hexagonal external shape at its outermost dimensions and the respective oxygen valve 63 and fuel valve 67 are disposed at an angle of 120° with respect to each other. As can be seen in FIG. 3, the oxygen valve 63 and the fuel valve 67 are constructed similarly. Consequently, only the construction of the oxygen valve 63 will be described in detail. The valve 63 has a poppet valve 81 and a seat 83 for sealingly engaging therebetween to stop the flow of oxygen, or controlling it at a desired volumetric flow rate. The seat 83 is effected by screwing an insert 85 into the tapped aperture 75. The insert 85 has a central bore 87 extending longitudinally thereof and in communication with the oxygen passageway 71. An aperture 89 extends laterally through a side wall of the insert 85 and into communication with the oxygen passageway 61, FIG. 4. Thus, when the poppet 81 is backed off from sealing engagement with its seat 83, oxygen is allowed to flow through the oxygen passageways 27, FIG. 2, and 71, FIG. 3, central bore 87, lateral aperture 89 and oxygen passageway 61 to the main passageway 57 for passage to the torch tip, with or without admixing with the fuel. The insert 85 may comprise any metallic insert that has satisfactory properties. Preferably, the insert 85 is formed of a material that is softer than the exterior surface of the poppet valve 81 so as to form a seal therewith. The insert 85 may be chrome plated if desired. As illustrated, it is formed of brass. Preferably, a special cold working brass, such as brass CDA 353, is employed such that it can be used with a stainless steel heat treated stem, or poppet valve 81, to form its own seat even if there are variations in concentricity. Furthermore, the cold working brass does not gall the poppet valve as does the standard free machining brass. The insert 85 is screwed inwardly until the shoulders of the larger threaded section 91 encounter the outermost surface of the head 21 to retain the insert in place against the torque forces used in seating and unseating of the poppet valve 81. The mating threaded surfaces are probably coated with an adhesive and screwed into place. This further adheres the mating threads together and prevents inadvertent loosening of the insert as the poppet valve 81 is backed off of its seat 83; also sealing against leakage of the oxygen past the threads.

When aluminum surfaces are to be joined to aluminum surfaces, priming is needed. On the other hand, with the joining of metals; such as, steel to steel, brass to brass, or steel to brass; there is no need for the primer.

Any of the conventionally available adhesives and primers may be employed. For example, the Loctite 35 comprising an admixture of polyurethane and polyester resins, may be employed as the adhesive and the primer may be Locquic Primer T comprising 90 percent trichloroethylene and 7 percent ethyl-propyl alcohol containing an organic sulfide.

The poppet valve 81 is carried by a valve stem assembly comprising a wheel 93, a stem 95, packing nut 97, packing 99 and stop washer 101. As illustrated, the wheel 93 is press fitted onto the splined portion 103 of the stem 95. The stem 95 has a threaded portion 105 that threadedly engages a tapped aperture in the insert 85. The packing nut 95 is screwed with mating threads around the exterior threaded portion of the larger threaded section 91 of the insert 85, holding the packing 99 trapped about the stem 95. Thus, to shut off flow, the wheel 93 is turned in the proper direction to seat the poppet valve 81 against its seat 83. When flow is desired, the wheel 93 is turned in the opposite direction to lift the poppet valve 81 from its seat 83. One advantage of the indicated construction is that the threaded portion 105, when moved outwardly far enough will encounter the stop washer 101 and prevent withdrawal of the valve completely out of its aperture, as can be done with the torch valves of the prior art. Expressed otherwise, the outward movement of the stop washer 101 will encounter the resilient material of the packing 99 and exert an increasingly greater compressive force that will eventually stop withdrawal of the poppet valve 81 before the threaded portion 105 is unscrewed completely from its tapped aperture in the insert 85.

The wheel 93 may be formed of any material. As illustrated, it is formed of green anodized aluminum to denote that it is the oxygen wheel and has a straight knurl on its exterior surface to facilitate hand tightening and loosening of the valve. The fuel wheel, on the other hand, is formed of red anodized aluminum. The colored anodized aluminum is provided for safety and ensures that the desired fuel or oxygen stream is adjusted by an operator without any chance of error.

The valve stem 95 is formed of stainless steel and has a hardened poppet valve 81 at its lower end for seating against the seat 83.

The packing nut 97 is a hex nut formed of aluminum, although any other material can be employed if desired.

The packing 99 may be formed of any conventional material employed for packing of such valves. I have found it preferable, however, to employ Teflon in order to provide the desired compressive strength to stop the outward movement of the stop washer and prevent the valve stem from being backed out of its tapped aperture.

The stop washer 101 is preferably a metallic washer, although other materials may be employed. As illustrated, it is formed of number 23 gauge CDA number 260 sheet brass having a spring temper.

Referring further to the torch 13, the head 21 also has a barrel end 109 having an annular barrel recess disposed peripherally thereabout and receiving the head end 111 of the barrel 23.

As illustrated, the exterior surface of the barrel end 109 and the interior surface of the head end 111 of the barrel 23 are primed with the primer and bonded with the adhesive, as described hereinbefore. Consequently, the barrel 23 can be assembled onto the barrel end 109 by relatively unskilled labor that are not required to recognize the proper color of silver solder or the like. The interior surface of the head end 111 of the barrel 23 and the exterior surface of the barrel end 109 of the head 21 are roughened before they are adhered together for greater strength. The roughening of the exterior surface of the barrel end 109 and the interior surface of the head end 111, as well as the interior surface of the barrel 23 that is adhered to the barrel end 113 of the body 115, may be effected, for example, by a plurality of Vee grooves having their sides of 32 pitch with 60° angle Vees and 0.008–0.010 inch deep. As illustrated, the barrel 23 has an exterior diamond knurl at its fore and aft sections to facilitate being gripped during use. The illustrated barrel 23 is formed of aluminum tubing and sealingly engages the barrel end 109 of the head 21 and the barrel end 113 of the body 115. The barrel 23 is tubular so as to define a sealed fuel passageway intermediate the fuel passageways 73 and 25 in the head 21 and in the body 115. The barrel 23 is also bonded with a nonmetallic adhesive, similarly as described hereinbefore, to the exterior surface of the barrel end of the body 115 to form the seal, similarly as it was sealingly bonded to the barrel end 109 of the head 21.

The body 115 of the torch 13, includes respective fuel and oxygen passageways 25 and 27 extending longitudinally therethrough. The fuel passageway 25 has a fuel adapter 117 screwed into a tapped aperture at the rear end of the body 115. Similarly, the oxygen passageway 27 has an oxygen adapter 119 screwed into a tapped aperture at the rear end of the body 115. The bosy 115 may be formed of any suitable material, such as extruded aluminum. The respective adapters may be formed of any suitable material. Preferably, the oxygen adapter is formed of green anodized aluminum whereas the fuel adapter 117 is formed of red anodized aluminum for safety, as delineated hereinbefore. The respective adapters 117 and 119 have interior surfaces for sealingly receiving a tail piece, or hose barb, as described later hereinafter with respect to FIG. 11.

A separate tube, such as the illustrated oxygen tube 119, FIGS. 2 and 5, connects the oxygen passageways 71 and 27 in the body 115 and in the head 21. The oxygen tube 119 thus serves to maintain the oxygen separate from the fuel until admixed downstream of their respective valves 63 and 67. As illustrated, the oxygen tube 119 has a threaded section 121 for being sealingly and threadedly received within the tapped aperture 79 in the head 21. Preferably, the threads on the threaded section 121 and in the tapped aperture 79 are primed and coated with a nonmetallic adhesive, similarly as described hereinbefore. The oxygen tube 119 has an annular recess 123 disposed peripherally about its other end. The recess 123 is dimensioned to conformingly fit with the interior of the oxygen passageway 27 in the body 115. The exterior surface of the recess 123 is primed and coated with the nonmetallic adhesive and is bonded to the interior wall of the passageway in the body 115 as illustrated in FIG. 2. Thus, again the oxygen tube 119 may be inserted by a less skilled laborer that does not have to recognize the proper color of silver solder or the like, as is conventionally employed in assembly.

The hose assembly 15 comprises Siamese-type tubing that is compatible with the variety of fuels that may be employed in the torch 13, and respective fittings 125 and 127 on each end. The tubing may be formed of any suitable material, such as, rubber or thermoplastic material. Suitable thermoplastic material includes polyvinyl chloride, polyethylene and the like. The oxygen fitting 125 comprises the hose barb illustrated in FIG. 11 and an exterior nut and fitting that is preferably formed from green anodized aluminum. Similarly, the fuel fitting 127 comprises the hose barb illustrated in FIG. 11 and a red anodized aluminum nut for being hand tightened onto its respective fuel adapter 117. The hose assembly 15 has similar hand tightenable hose barbs and nuts at the other end for being fastened to a regulator. As illustrated, the nuts are hex nuts that can also be tightened with a wrench. It is preferable to employ round, knurled nuts, such as illustrated in FIGS. 7 and 12, if wrench tightening is to be avoided.

In operation, the hose assembly is connected with the regulator (not shown) and with the respective adapters 117 and 119 in the body 115 of the torch 13. The torch 13 will have been assembled as indicated hereinbefore, the insertion of the oxygen tube being made before the barrel is installed intermediate the body 115 and the head 21. The torch tip is positioned at any desired angle and the knurled portion 41 of the elbow nut 35 tightened to seal the flared end 37 against the resilient gasket 47. The respective oxygen and fuel valves 63 and 67 will have been installed in the head 21. After the suitable pressure is adjusted on the regulator, the fuel valve 67 may be opened to pass fuel out of the torch tip 17. The fuel is ignited using a conventional igniter. Thereafter, the desired flow rate is adjusted and oxygen valve 63 is opened to obtain the desired clear colorless flame for performing the desired fine work. Conversely, after the work is finished, the oxygen valve is closed and the fuel valve 67 is closed thereafter. Preferably, the valve on the main supplies of fuel and oxygen will be closed if the torch is not to be employed for a prolonged interval. The respective supplies of fuel and oxygen will ordinarily comprise bottled gas; although in certain manufacturing installations, the fuel and oxygen may be piped from a central facility to a plurality of welding or heating positions.

ANOTHER EMBODIMENT

Another embodiment is illustrated in FIGS. 7, et seq. Therein, similarly as with FIG. 1, the torch assembly comprises the torch 13 and the hose assembly 15.

Also, the torch 13 includes the major elements and assemblies of the torch tip 17; elbow assembly 19; head 21; barrel, or handle, 23; and fuel and oxygen passageways 25 and 27, FIG. 8, extending longitudinally within the barrel 23.

The torch tip 17 is the same as described and illustrated hereinbefore in FIG. 2A.

The elbow assembly 19 is operationally the same as described hereinbefore. Its tip end 39 is the same as described hereinbefore. Its head end 37, however, employs a dual seal feature. Specifically, the inner end 131 sealingly seats against the resilient gasket 47, just as did the flared end 37 of the embodiment of FIG. 6. It is retained in this sealing engagement by way of the knurled elbow nut 35 engaging a retaining ring 133. The retaining ring 133 is a C-ring that is slipped into an annular groove 135 after the elbow nut is emplaced, following chrome plating of the elbow. This solves manufacturing and assembly problems, yet does not require a flared end.

Adjacent the tip end 39, the elbow assembly also contains the filter 51, similarly as described hereinbefore. In the illustrated embodiment, a stainless steel screen is employed as the filter. Otherwise, the same construction is employed in the elbow assembly as described hereinbefore with respect to FIGS. 2 and 6.

The resilient gasket 47 is the same as described hereinbefore.

The head 21 has the same structure as described hereinbefore with respect to FIGS. 2 and 4. In the embodiment of FIG. 7, however, the oxygen valve 63 and the fuel valve 67 have slightly different construction, as illustrated in FIG. 9. As described with respect to FIG. 3, the oxygen valve 63 and the fuel valve 67 have the same basic construction so only the oxygen valve will be described in detail. Each valve has a poppet valve 81 and a seat 83, as described hereinbefore. The seat 83 is formed by an insert 85 that is screwed into the threaded aperture 75 of the heat 21. The insert 85 sealingly engages a resilient gasket 86 that is disposed on a shoulder at the bottom of tapped aperture 75. Thus, leakage of gas past the engaging threads is prevented. As illustrated in FIG. 9, however, the insert has external shoulders 139 and a gasket 141 is employed intermediate the external shoulders and the exterior of the head 21 to enable tightening with the desired amount of torque to effect sealing if desired. For example, a torque of 30–35 inch pounds has been found adequate to effect a suitable seal with the insert 85. If desired, of course, the insert 85 can be primed and coated with a sealant such as the Locquic primer and the Loctite number 35. The insert 85 still has the bore 87 traversing longitudinally thereof and in communication with the oxygen passageway 71. An aperture 89 above the seat 83 still communicates with the oxygen passageway 61 as described hereinbefore.

The valve stem assembly includes the same elements of the wheel 93, the stem 95, the packing nut 97, the packing 99, and the stop washer 101. In this embodiment, the wheel 93 is preferably adhered to the splined portion 103 by way of the Loctite. The primer may or may not be used, depending on the metals being employed, as described hereinbefore.

The same functional and operational features are employed in the valves as described hereinbefore. The main difference is that an O-ring is employed as the packing 99 for sealingly engaging the packing nut 97 and the stem 95.

Referring further to the torch 13, in the barrel end 109 of head 21 there is screwed a plurality of hose barbs 143, A and B, similar to hose barb 143 illustrated in FIG. 10. Each of the hose barbs are screwed into tapped apertures. The respective mating portions of the hose barb and the tapped aperture preferably have their surfaces primed and coated with the Locquic primer and the Loctite number 35 adhesive for sealing engagement to prevent leakage. Each of the respective oxygen and fuel hoses 145 and 147 are inserted on their respective hose barbs 143 A and B. The oxygen hose barb 143A is preferably formed of green anodized aluminum whereas the fuel hose barb 143B is preferably formed of red anodized aluminum.

The barrel 23 will have been previously slipped over the respective fuel and oxygen hoses 145 and 147. The barrel is now slid into position exteriorly of the respective hoses. The head end 111 of the barrel 23 is screwed onto the barrel end 109 of the head 21. Preferably, the mating roughened surfaces are adhered together with the Locquic primer and the Loctite adhesive; although this may be dispensed with if suitable threaded engagement is employed, since there is no need for sealing in this embodiment. Expressed otherwise, the barrel 23 serves as a handle and to protect the respective hoses rather than defining a passageway for one of the gases, such as the fuel. As illustrated hereinbefore, the respective hoses 145 and 147 are formed by splitting a Siamese-type tubing, such as described hereinbefore. Preferably, the hose employs green tubing as the oxygen tubing and red tubing as the fuel tubing. Suitable hose ties may be employed to prevent splitting of the Siamese tubing. Typically, the hose ties may be comprised of aluminum, elliptically shaped loops encircling the hoses.

At the other end of the hose assembly, hand tightenable fittings are employed for affixing the hoses to the adapters on the regulators. The adapters on the regulators are conventional adapters, such as illustrated as adapters 117 and 119 in FIG. 2. Suitable hand tightenable nuts 125 and 127 are employed for, respectively, the oxygen and fuel. The nuts are disposed about respective fittings, such as the hose barb 151, FIG. 11. The hose barb 151 is inserted within the respective tubing forming the hoses 145 and 147. An annular shoulder 153 is provided for being engaged by the respective nuts, such as nut 125, FIG. 12. As a consequence, the O-ring 155 is held in sealing engagement interiorly of a wall of the respective fitting, such as fitting 119, FIG. 2, and sealingly engaging the recess 157 in the hose barb 151. With this structure, sealing engagement is attained or released by hand operation of the respective nuts without requiring use of a wrench.

In the embodiments described hereinbefore, the use of Locquic and Loctite has been described for the respective primer and nonmetallic adhesive. Any other suitable adhesive may be employed, as indicated. For example, the Eastman 910, comprising the cyanoacrylates, or epoxy resin plus a catalyst may be employed.

As indicated hereinbefore, the materials of construction that are ordinarily employed in this art are employed in this invention and there is no need for exotic new materials.

The operation of the embodiment of FIG. 7 et seq is substantially the same as described hereinbefore with respect to the embodiment of FIGS. 1-6.

From the foregoing descriptive matter, it can be seen that this invention provides the objects delineated hereinbefore. Specifically, the respective embodiments have one or more of the desirable features delineated hereinbefore and not heretofore provided. Specifically, both embodiments provide features 1-10. The embodiment of FIGS. 1-6 provides a structure that is bonded together, yet enables assembly by less skilled workmen that need not have great strength or great skills in silver soldering or the like.

The embodiment of FIG. 7, et seq., enables employing a molded plastic handle, such as formed of acrylonitrile butadiene styrene copolymer (ABS) such that the barrel acts as an insulating handle that protects the hoses.

Although this invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A precision torch assembly comprising:
   a. a small torch tip with a small orifice therein;
   b. an elbow assembly that is connected at its exterior end with said torch tip; said elbow assembly including:
      i. a tubular elbow that is straight adjacent its head end and is bent at a predetermined angle and is rotatable such that its tip end can be rotated to facilitate viewing and using the torch; said head end comprising a smooth end that is adapted to sealingly seat against a resilient gasket and retain its seal even if said elbow is rotated about its longitudinal axis to a new angle for optimum viewing and using;
      ii. an elbow nut disposed peripherally about said smooth end and retaining it in engagement with said gasket; said elbow nut having a knurled portion for hand tightening and a threaded portion for retaining the sealing engagement between said smooth end and said gasket;
   c. a resilient gasket sealingly engaging said smooth end of said elbow such that said elbow can be rotated to any desired angle and still provide a sealed interconnection with a first annular recess in a head;
   d. a head including:
      i. an elbow end having a first main passageway therewithin;

ii. a first annular recess disposed peripherally about said first main passageway and having said resilient gasket and said smooth end sealingly retained therewithin and a threaded bore disposed peripherally about said first main passageway and containing said threaded portion of said elbow nut;

iii. respective fuel and oxygen passageways connected with said first main passageway and having respective poppet valves and seats sealingly and adjustably interposed therewithin;

iv. a barrel end having an annular barrel recess disposed peripherally thereabout;

d. a barrel having its head end disposed in said annular barrel recess and about said barrel end of said head and connected to said barrel end of said head for serving as a handle; and e. respective fuel and oxygen passageways extending longitudinally within said barrel and adapted at their hose ends for sealing connection with respective fuel and oxygen hoses.

2. The precision torch assembly of claim 1 wherein said tubular elbow includes built-in filter adjacent its tip end; said filter comprising a screen for preventing small contaminants from stopping up said small aperture in said tip and a screen retaining ring retaining said screen in place; said screen being formed of a heat conductive material such that said screen will operate as a flashback arrester; said screen also having a fine enough mesh that it will not only act as said flashback arrester but also as a gas mixer for agitating and admixing the fuel and oxygen.

3. The precision torch tip of claim 1 wherein there is provided Siamese-type hose comprising one hose that is color coded green for oxygen and one hose that is color coded red for fuel; said Siamese-type hose having means for attaching the respective ends of said hose, respectively, to said torch and a regulator; said means for attaching said hose at the regulator end comprises hand tightenable fittings including a pair of hose barbs in said hose and hand tightenable fittings over said hose barbs; said hose barbs including respective O-rings disposed annularly about a male protruding end for conformingly fitting within a female fitting on a conventional regulator; said hand tightenable fitting for said oxygen being color coded green and said hand tightenable fitting for said fuel being color coded red.

4. The precision torch assembly of claim 3 wherein said hand tightenable fittings are formed of anodized aluminum of the respective colors.

5. The precision torch assembly of claim 1 wherein said head has respective oxygen valve and fuel valve defining the respective said poppet valves and seats; and said valves include a packing nut and packing above a stop washer all disposed about a valve stem; said valve stem having a threaded portion for tightening said poppet valve against said seat; wherein said threaded portion has a larger diameter than said stop washer such that when said valve is opened, said threaded portion will engage said stop washer and compress said stop washer against said packing within said packing nut to prevent completely unscrewing said valve stem.

6. The precision torch assembly of claim 5 wherein said valve seat is defined by an insert screwed into a tapped aperture in said head; said insert being formed of cold working brass such that it forms a seat with said poppet valve; said poppet valve being formed of a hardened steel stem to prevent galling when moved downwardly to sealingly seat against said cold working brass insert.

7. The precision torch assembly of claim 1 wherein said barrel has its head end disposed in said annular barrel recess and about said barrel end of said head and sealingly adhered to said barrel end of said head with a nonmetallic adhesive; said barrel having a body end of tubular construction similar to said head end for conformably fitting about a barrel recess of a body; and wherein there is provided:

a. a body having:

i. respective fuel and oxygen passageways extending longitudinally therethrough and adapted at their hose end for sealingly receiving respective fuel and oxygen adaptors for connecting with respective fuel and oxygen hoses;

ii. a barrel end having a second annular barrel recess disposed peripherally thereabout; said second annular barrel recess being inserted within said body end of said barrel and sealingly adhered thereto with a nonmetallic adhesive; and b. a separate tube connecting one of said passageways in said head with one of said passageways in said body for separation of said fuel and said oxygen upstream of said main passageway of said head; said separate tube being inserted within the surrounding surfaces of said respective passageways and sealingly adhered to the surrounding surface with a nonmetallic adhesive.

8. The precision torch assembly of claim 7 wherein said elbow assembly has a flared smooth end that sealingly engages said resilient washer and allows rotation of said torch tip to the desired angle.

9. The precision torch assembly of claim 1 wherein said barrel is formed of a thermoplastic material so as to have good heat insulating qualities.

10. The precision torch assembly of claim 1 wherein said elbow has a retaining ring disposed annularly in a groove about its head end for engaging said elbow nut and holding said head end in sealing engagement with said resilient gasket; said retaining ring being removable for allowing insertion and removal of said elbow nut over said head end of said elbow.

* * * * *